(12) United States Patent
Kim

(10) Patent No.: US 10,051,474 B1
(45) Date of Patent: Aug. 14, 2018

(54) TERMINAL HAVING SECURITY FUNCTION

(71) Applicant: Taek Jin Kim, Daegu (KR)

(72) Inventor: Taek Jin Kim, Daegu (KR)

( * ) Notice: Subject to any disclaimer, the term of this patent is extended or adjusted under 35 U.S.C. 154(b) by 0 days.

(21) Appl. No.: 15/745,872

(22) PCT Filed: Jul. 13, 2016

(86) PCT No.: PCT/KR2016/007607
§ 371 (c)(1),
(2) Date: Jan. 18, 2018

(87) PCT Pub. No.: WO2017/014484
PCT Pub. Date: Jan. 26, 2017

(30) Foreign Application Priority Data

Jul. 21, 2015 (KR) ........................ 10-2015-0103273

(51) Int. Cl.
*H04W 12/08* (2009.01)
*G06F 21/85* (2013.01)

(52) U.S. Cl.
CPC ............ *H04W 12/08* (2013.01); *G06F 21/85* (2013.01)

(58) Field of Classification Search
CPC .............................. H04W 12/08; G06F 21/85
See application file for complete search history.

(56) References Cited

U.S. PATENT DOCUMENTS

| 2002/0059176 | A1* | 5/2002 | Fujisawa | G06F 17/30899 |
| 2007/0033569 | A1* | 2/2007 | Davidson | G06F 17/30902 |
| | | | | 717/103 |
| 2014/0337007 | A1* | 11/2014 | Waibel | G06F 17/289 |
| | | | | 704/3 |

FOREIGN PATENT DOCUMENTS

| JP | 2007-504714 A | 3/2007 |
| JP | 2008-053988 A | 3/2008 |
| KR | 20-0288715 Y1 | 9/2002 |
| KR | 10-2004-0071553 A | 8/2004 |
| KR | 10-0651830 B1 | 12/2006 |
| KR | 10-2007-0100505 A | 10/2007 |

* cited by examiner

*Primary Examiner* — Dinh P Nguyen
(74) *Attorney, Agent, or Firm* — Novick, Kim & Lee, PLLC; Jae Youn Kim

(57) ABSTRACT

Provided is a terminal having a security function, which: comprises, within one case, both a driving unit (hereinafter, referred to as "online driving unit") capable of an online operation and a driving unit (hereinafter, referred to as "non-online driving unit) not requiring an online operation; and connects the driving units to a memory, wherein the memory is not concurrently connected to a plurality of driving units, but is selectively connected to only one of the driving units, so that perfect security against hacking and the like can be maintained.

4 Claims, 2 Drawing Sheets

TERMINAL HAVING SECURITY FUNCTION

TECHNICAL FIELD

The present invention relates to a terminal having a security function, and more particularly, to a terminal having a security function that has a driving unit capable of performing an online operation and a driving unit capable of performing only an offline operation disposed within one case in such a manner as to be connected to a memory, wherein the memory is not concurrently connected to the driving units, but is connected selectively to only one of the driving units, so that perfect security against hacking and the like can be maintained.

BACKGROUND ART

With the development of telecommunication technologies and wide-spreading of telecommunication equipment, recently, terminals having various operation functions such as a desktop computer, a laptop, a smart phone, a smart pad, and so on are used over almost fields in living, and data, which are already produced or acquired and thus stored in the terminals, or data (video data, voice data, etc.), which can be acquired in real time through the terminals, is transferred whenever and wherever to other terminals through communication network like internet network, thereby improving the conveniences in work.

However, hacking technologies, which use the conveniences for a bad purpose, that is, which are accessed illegally to the data recorded in another person's terminal or acquired through his or her terminal to use the data for a bad purpose, are also developed, and accordingly, security technologies for protecting the data of the terminals from hacking are rapidly developed and suggested.

Through the security technologies, however, the security is not perfectly achieved, and so as to basically prevent the illegal use of data, accordingly, an offline terminal having no communication connection and an online terminal having communication connection are all used. Only in case where data transfer to the outside is needed, the online terminal is used, and the other work is performed in the offline terminal. The data of the offline terminal is transferred to the online terminal only through portable memory means like a USB memory, and whenever the data transfer is performed, accordingly, the USB memory should be moved, thereby causing many inconveniences in use.

Accordingly, the plurality of terminals should be provided to undesirably occupy large space, and so as to solve the above-mentioned problem, a desktop computer technology is disclosed in Korean Utility Model Registration No. 20-0288715 wherein an interior of a main body is divided into two sections where two boards separated functionally are provided to enhance space utilization, a KVM switch is used to commonly use a monitor, a keyboard and so on, and connection to external internet network and connection to internal administrative network requiring security are concurrently performed in real time by means of one desktop computer.

According to the conventional technology, however, USB ports as means for transferring materials between the plurality of boards are provided on the respective boards, and so as to perform data transfer, in this case, the two boards are necessarily connected to each other by means of the USB ports, so that in the connection state of the two boards, the data in the two boards can be all hacked through external internet network, thereby still causing a weakness in security.

DISCLOSURE

Technical Problem

Accordingly, the present invention has been made in view of the above-mentioned problems occurring in the prior art, and it is an object of the present invention to provide a terminal having a security function that has a driving unit (hereinafter, referred to as "online driving unit") capable of performing an online operation and a driving unit (hereinafter, referred to as "non-online driving unit") capable of performing only an offline operation disposed within one case in such a manner as to be connected to a memory, wherein the memory is not concurrently connected to the online and non-online driving units, but is selectively connected to only one of the online and non-online driving units, so that perfect security against hacking and the like can be maintained, inconveniences caused by moving and connecting an external memory for data transfer are removed, the connection of the memory is controlled by simple switch manipulation to improve conveniences in use.

It is another object of the present invention to provide a terminal having a security function that has a telephone call unit provided separately from an online driving unit and a non-online driving unit to perform a call through an internet telephone or public telephone network, wherein the telephone call unit is programmatically blocked from the online driving unit at the time when the call is tried so that it is impossible to record the signal generated during the call, and if voice recording is needed, a voice recording program is built in the non-online driving unit to allow the signal generated during the call to be recorded in the non-online driving unit according to a user's selection.

Technical Solution

To accomplish the above-mentioned objects, according to the present invention, there is provided a terminal having a security function including: an online driving unit and a non-online driving unit disposed within one case; a memory connected to the online driving unit and the non-online driving unit; and a first switching unit for physically controlling the connection of the memory, so that the memory is connected selectively to one of the online driving unit and the non-online driving unit, without being connected to the online driving unit and the non-online driving unit, concurrently.

According to the present invention, desirably, the terminal further includes a telephone call unit provided separately from the online driving unit and the non-online driving unit to perform a call through an internet telephone or public telephone network, the telephone call unit being programmatically blocked from the online driving unit at the time when the call is tried so that it is impossible to record the signal generated during the call, and if the voice recording is needed, a voice recording program is built in the non-online driving unit to allow the signal generated during the call to be recorded in the non-online driving unit according to a user's selection.

According to the present invention, desirably, the terminal further includes external information acquisition means having a camera and a mike used in the terminal in such a manner as to be controlled in the connection to the online driving unit and the non-online driving unit through a second switching unit, and during the driving of the online driving unit, the external information acquisition means is not programmatically connected to the online driving unit, so that any one or both of the camera and the mike of the external information acquisition means is connected selectively to the telephone call unit through a third switching unit during the driving of the telephone call unit, thereby making it impossible to record the electrical signal acquired by the camera or mike illegally.

According to the present invention, desirably, the external information acquisition means further includes physical blocking covers so that it is basically impossible to acquire external information irrespective of electrical connection.

According to the present invention, desirably, the first to third switching units and a voice recording switching unit are used with one or all selected from a hardware switch manipulated physically by the user, a software switch displayed on a display of the terminal, and a programmed switch that programmatically executes an arbitrary program to automatically finish a connection function, that is, to execute connection control if the program ends.

According to the present invention, desirably, if any one of the first to third switching units or the physical blocking covers is manipulated, the functions connected correspondingly to the arbitrary programs built in the online driving unit, the non-online driving unit, and the telephone call unit are concurrently manipulated (executed or blocked).

According to the present invention, desirably, the terminal generally includes a desktop computer, a laptop, a smart phone, a smart pad, and so on.

Advantageous Effects

According to the present invention, the terminal having a security function basically blocks the online connection of the non-online driving unit in which the data requiring security is recorded and if external transfer of data is needed, transfers the data only through the first switching unit, thereby making it convenient to use, occupying no large space, and keeping perfect security.

In addition, the terminal having a security function according to the present invention makes it impossible to acquire external information including already produced data as well as data acquired in real time by a camera or mike, thereby allowing the terminal to be used safely.

Moreover, the terminal having a security function according to the present invention basically prevents the illegal voice recording and data loss caused by the online driving unit in a call.

EXPLANATIONS ON REFERENCE NUMERALS

Figure 1:
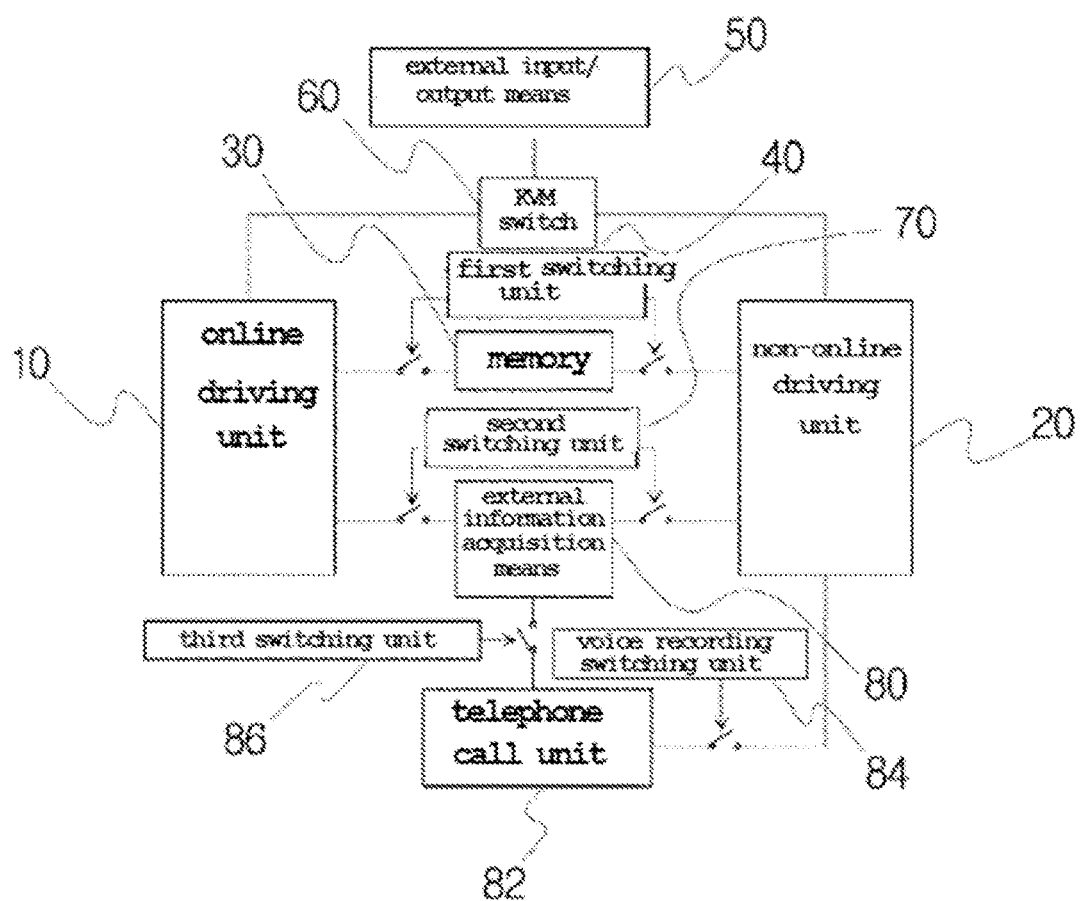
FIG. 1 is a block diagram showing a terminal having a security function according to the present invention.
Figure 2:
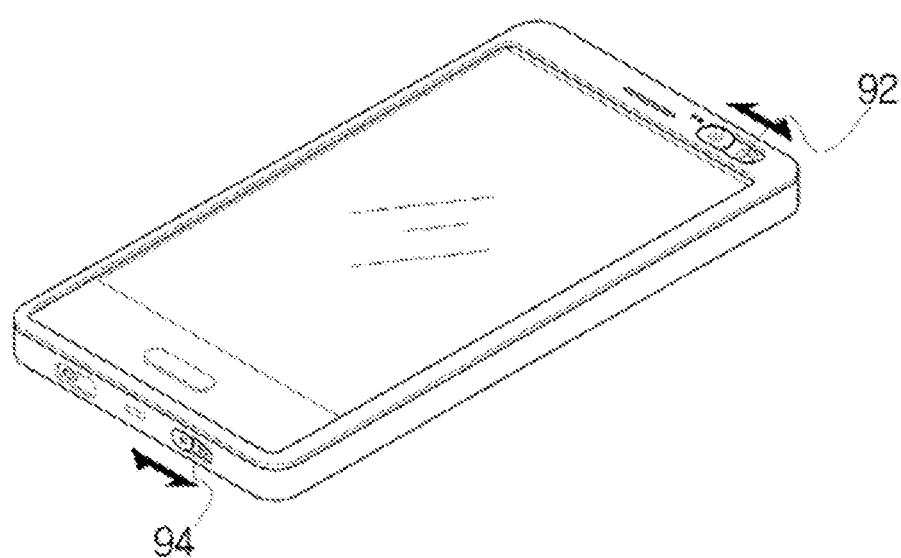
FIG. 2 is a perspective view showing the terminal having a security function according to the present invention.

10: online driving unit
20: non-online driving unit
30: memory
40: first switching unit
50: external input/output means
60: KVM switch
70: second switching unit
80: external information acquisition means
82: telephone call unit
84: voice recording switching unit
86: third switching unit
92, 94: blocking cover

MODE FOR INVENTION

Hereinafter, an explanation on a terminal having a security function according to the present invention will be in detail given with reference to the attached drawing.

A terminal having a security function according to the present invention largely includes an online driving unit 10 capable of performing an online operation and a non-online driving unit 20 capable of performing only an offline operation and recording data requiring security disposed within one case (not shown) in such a manner as to be connected to a memory 30, wherein the memory 30 is not concurrently connected to the online driving unit 10 and the non-online driving unit 20, but is connected selectively to only one of the online driving unit 10 and the non-online driving unit 20, through a first switching unit 40.

The terminal generally includes a desktop computer, a laptop, a smart phone, a smart pad, and so on, and the online driving unit 10 and the non-online driving unit 20 of the terminal may include respective external input/output means 50 capable of acquiring external information, such as a keyboard, a monitor, a mouse, a speaker and so on. In this case, however, a large space is needed, and accordingly, a KVM switch 60 is disposed in the case to use one external input/output means 50.

Further, the online driving unit 10 and the non-online driving unit are operation devices having CPUs, hard disk drives, RAMs, and so on, and the online driving unit 10 is a part connectible to internet network, in which a data transmitting/receiving program to/from an external terminal through online connection like internet and a communication module are built, so that the online driving unit 10 transmits and receives mails, drives an explorer, chats with other terminals, and performs remote connection. In this case, the online driving unit 10 does not include a telephone call unit 82.

The non-online driving unit 20 does not include any communication module for online connection so that it is impossible to transmit data to the external terminal through online connection, and accordingly, the non-online driving unit 20 builds programs for document and drawing work executable in the terminal and communicates with only external input/output means (mouse, keyboard, monitor, and so on) connected directly thereto and the telephone call unit 82 as will be discussed later, so that the non-online driving unit 20 is used only for work requiring security.

On the other hand, the telephone call unit 82, which allows a call to be performed through an internet telephone or public telephone network, is provided separately from the online driving unit 10 and the non-online driving unit 20. The telephone call unit 82 has a small capacity memory required for the call, but it does not have any large capacity memory for storing call data.

Further, the terminal includes external information acquisition means 80 selectively connected to the online driving unit 10, the non-online driving unit 20, and the telephone call unit 82, and the external information acquisition means 80 includes a mike and a speaker. Only if the external information acquisition means 80 directly acquires external information, it does not matter in kind.

The connection between the online driving unit 10 and the memory 30, the connection between the memory 30 and the non-online driving unit 20, the connection between the telephone call unit 82, the external information acquisition means 80 and the non-online driving unit 20, and the connection between the external information acquisition means 80, the online driving unit 10 and the telephone call unit 82 are controlled by a switching unit. The switching unit includes a first switching unit 40 for controlling the connection between the memory 30 and the online driving unit 10 and the connection between the memory 30 and the non-online driving unit 20, a second switching unit 70 for controlling the connection between the external information acquisition means 80 and the online driving unit 10 and the connection between the external information acquisition means 80 and the non-online driving unit 20, a third switching unit 86 for controlling the connection between the external information acquisition means 80 and the telephone call unit 82, and a voice recording switching unit 84 for controlling the connection between the telephone call unit 82 and the non-online driving unit 20.

Further, the switching units are used with one or all selected from a hardware switch manipulated physically by a user, a software switch displayed on a display of the terminal, and a programmed switch that programmatically executes an arbitrary program to automatically finish a connection function, that is, to execute connection control if the program ends. Further, priority is determined on the hardware switch, the software switch, and the programmed switch, and top priority is first operated before other switches.

Moreover, the external information acquisition means 80 includes physical blocking covers 92 and 94 so that it is basically impossible to acquire external information irrespective of electrical connection.

In more detail, the lens blocking cover 92 is disposed in front of a camera lens to block the camera lens with simple manipulation if necessary, so that it is perfectly impossible to acquire the external information acquisition, and further, the mike blocking cover 94 is disposed on the mike to block external sound acquisition.

The lens blocking cover 92 or the mike blocking cover 94 may be manufactured to the form of an accessory, separately from the terminal, or may be manufactured unitarily with the terminal at the time when the terminal is made. In case of the smart phone or smart pad, especially, the mike and camera are built unitarily in a case thereof, so that the blocking covers 92 and 94 may be formed unitarily with the terminal at the time when the terminal is made.

Now, an explanation on an operation of the terminal having the security function according to the present invention will be given.

First, document work, drawing work, and so on are executed by the user through the non-online driving unit 20 requiring no security connection and are then recorded on the non-online driving unit 20. If external transfer of the data is needed, the first switching unit 40 is manipulated by the user to connect the non-online driving unit 20 and the memory 30 with each other, and the data in the non-online driving unit 20 is transferred to the memory 30. If the data transferring is finished, the driving of the first switching unit 40 is controlled to connect the memory and the online driving unit 10, and the data stored in the memory 30 is transferred to the online driving unit 10 and then to the outside.

During the operation of the online driving unit 10, the second switching unit 70 prevents the external information acquisition means 80 like the mike, the camera, and so on from being connected to the online driving unit 10 so that it is impossible to perform real time data collection, that is, wiretapping, through external terminals. Even during the operation of the online driving unit 10, the external information acquisition means 80 may be driven according to the selection of the user.

In more detail, in case of exchange of data like document through internet, for example, in case of simple mail exchange through internet, the external information acquisition means 80 is not connectible to the online driving unit 10, but in case where internet broadcasting, video chatting or voice chatting is necessarily performed by the selection of the user, the external information acquisition means 80 is connectible to the online driving unit 10. The connection of the external information acquisition means 80 to the online driving unit 10 is determined through the manipulation of the second switching unit 70, and in this case, the connection limit by the hardware or software switch among the hardware, software and programmed switches is first performed.

Further, the telephone call unit 82 is basically blocked from the online driving unit 10, and even during a call try through the internet telephone, the telephone call unit 82 is programmatically blocked from the online driving unit 10, so that it is impossible to record the signal generated from the call in the online driving unit 10. If the voice recording is needed, however, a voice recording program is built in the non-online driving unit 20 to allow the data acquired in the telephone call unit 82 through the voice recording switching unit 84 to be recorded in the non-online driving unit 20. If the call is connected or disconnected according to the selection of a programmed switch, that is, a call button, the voice recording switching unit 84 is selected with one or more buttons among voice recording buttons disposed softwarily or hardwarily.

So as to drive the telephone call unit 82, on the other hand, the external information acquisition means 80 has to be connected to the telephone call unit 82, and the connection between the telephone call unit 82 and the external information acquisition means 80 is controlled by the third switching unit 86. The third switching unit 86 is replaced by a 'call' or 'exit' button disposed for call.

If any one of the switching units or the blocking covers is manipulated, on the other hand, the functions connected correspondingly to the arbitrary programs built in the online driving unit 10, the non-online driving unit 20, and the telephone call unit 82 are concurrently manipulated (executed or blocked).

If the external information acquisition means 80 is blocked by means of the blocking cover during the call try through the telephone call unit 82, the call automatically ends, and if the voice recording button is driven, the telephone call unit 82 is connected to the non-online driving unit 20 to allow the voice recording program connected to the non-online driving unit 20 to be executed to achieve the voice recording.

The invention claimed is:

1. A terminal having a security function, the terminal comprising:
   within one case,
   an online driving unit capable of performing an online operation;
   a non-online driving unit capable of performing an offline operation and recording data requiring security therein,
   a memory connected to the online driving unit and the non-online driving unit;

a first switching unit for physically controlling the connection of the memory so that the memory is connected selectively to one of the online driving unit and the non-online driving unit, without being concurrently connected thereto; and a telephone call unit provided separately from the online driving unit and the non-online driving unit to perform a call through an internet telephone or public telephone network, wherein the telephone call unit is programmatically blocked from the online driving unit at the time when the call is tried so that it is impossible to record the signal generated during the call, and if the voice recording is needed, a voice recording program is built in the non-online driving unit to allow the signal generated during the call to be recorded in the non-online driving unit according to a user's selection.

2. The terminal according to claim 1, further comprising external information acquisition means having a camera and a mike in such a manner as to be controlled in the connection to the online driving unit, the non-online driving unit, or the telephone call unit through switching units.

3. The terminal according to claim 2, wherein the external information acquisition means further comprises physical blocking covers.

4. The terminal according to claim 1, wherein if any one of the switching units or the physical blocking covers is manipulated, the functions connected correspondingly to the arbitrary programs built in the online driving unit, the non-online driving unit, and the telephone call unit are concurrently executed or blocked.

* * * * *